United States Patent Office 3,778,517
Patented Dec. 11, 1973

3,778,517
COMPOSITIONS OF MATTER CONTAINING HELIOTROPYL NITRILE AS A FLAVORING AGENT AND SWEETENER
James S. Neely, Liberty Township, Ohio, assignor to The Procter & Gamble Company, Cincinnati, Ohio
No Drawing. Filed Jan. 20, 1971, Ser. No. 106,936
Int. Cl. A23l 1/26
U.S. Cl. 426—175                              40 Claims

ABSTRACT OF THE DISCLOSURE

Compositions which contain as a flavoring agent and sweetener from about .0001% to about 20.0% of heliotropyl nitrile, i.e. piperonyl nitrile.

BACKGROUND OF THE INVENTION

Field of the invention

The present invention relates to flavor and sweetening compositions containing heliotropyl nitrile which can be used to impart a desirable flavor and sweetness to a variety of oral and labial compositions such as beverages, foods, dentifrices, lipsticks and the like, which may or may not be ingestible, with or without the use of other flavorants and sweeteners. The present invention also relates to a variety of oral and labial compositions and the like embodying heliotropyl nitrile as a flavoring agent and sweetener. Also, this invention relates to potentiating the sweetness of certain sugars and certain synthetic non-sugar sweeteners and compositions containing said sugars and sweeteners. The present invention still further relates to enhancing the flavor of commonly known flavorants and compositions containing such flavorants.

In recent years, there has been considerable activity aimed toward the production of artificial sweetening and flavoring agents for use by persons affected by physiological disorders such as diabetes mellitus and by those who must restrict their caloric intake as part of a weight control regimen. Such artificial sweeteners and flavoring agents have also found wide application for use in certain oral and cosmetic compositions. Examples of such compositions include beverages and foodstuffs for ingestion, lipsticks, and lip pomades, dentifrices, mouthwashes, mouthsprays and the like. Such artificial sweeteners and flavorants are advantageous in oral compositions as they are non-cariogenic. This non-cariogenicity apparently arises from the fact that these artificial sweeteners and flavorants are not metabolized by oral bacteria to form acids in the mouth, said acids being the primary cause of dental caries.

Heretofore, sweetness and flavoring characteristics have been imparted to the compositions described above by the use of various synthetic sweeteners and flavorants. The most commonly used artificial sweeteners have been the cyclamates, which have recently come under governmental restriction and are no longer commonly used, and the saccharin compounds. Although the saccharin compounds possess sweetness charactristics, they are undesirable as the sole sweetening agent in most food and beverage compositions because of the lingering bitter aftertaste perceived by most users.

While saccharin and the cyclamates have been in common use as artificial sweetening agents for a number of years, there has been more recently discovered a series of new artificial sweeteners which can be broadly classified as dihydrochalcones. For example, Horowitz and Gentili, U.S. Pat. 3,087,821, teach the use of various dihydrochalcones having sugar substituents (glyconic dihydrochalcones) as sweetening agents. The recently filed application of Rizzi, entitled "Dihydrochalcone Sweetening Agents," Ser. No. 76,972, filed Sept. 30, 1970 discloses the use of certain aglyconic dihydrochalcones as sweetening agents. Still another recently discovered synthetic sweetener [6-(trifluoromethyl)tryptophane] is disclosed by Kornfeld in U.S. Pat. 3,535,336 which issued on Oct. 20, 1970.

THE PRIOR ART

Heliotropyl nitrile, i.e., piperonyl nitrile, is not a new compound and is known in the art. See, for example, U.S. 3,338,783 issued to Papjak on Aug. 29, 1967. However, the art does not teach either the sweetening and flavoring characteristics of heliotropyl nitrile or the compositions of the present invention.

Accordingly, it is a primary object of the present invention to provide a variety of oral and labial compositions having desirable sweetness and flavor characteristics.

It is another primary object of the present invention to provide improved sweetening and flavoring compositions.

It is still another object of the present invention to provide low calorie, relatively non-cariogenic sweeteners and flavor compositions.

It is another object of the present invention to provide improved sweetening and flavoring compositions containing commonly known sweeteners and/or flavorants.

It has been surprisingly found that compositions which contain from about .0001% to about 20.0% of heliotropyl nitrile possess highly desirable sweetness and flavor characteristics with or without the addition of optional sweeteners and/or flavorants. The compositions of the present invention embody a variety of oral and labial compositions containing heliotropyl nitrile in preferred amounts, suitable for use in their intended form. The compositions of the present invention also embody a variety of dry as well as liquid concentrates which can then be added in the appropriate amounts to oral and labial compositions imparting to such compositions desirable sweetness and enhanced flavor qualities. Depending on the composition, heliotropyl nitrile may be added alone, or as one of the concentrated compositions which are more fully discussed hereinafter.

It has also been surprisingly found that when heliotropyl nitrile is mixed or codissolved with commonly known sweeteners, the result is a composition possessing significantly enhanced sweetness characteristics.

It has further been found that when heliotropyl nitrile is mixed or codissolved with or in commonly known flavorants, the results is a significantly enhanced flavor.

The present invention also relates to a method of imparting and to enhancing the flavor and sweetness of oral and labial compositions and the like by adding to said compositions heliotropyl nitrile or concentrated compositions containing heliotropyl nitrile in the proper amounts.

The term "labial" as used herein refers to all compositions which in the ordinary course of usage come into contact with the lips. Such compositions include, for example, lipsticks and lip pomades. The term "oral compositions" as used herein refers to all compositions which in their ordinary course of usage come into contact with the surfaces of the oral cavity, and include compositions for use in the oral cavity, and those that are ingested (ingestible compositions) or inhaled through the oral cavity. Such compositions include a variety of beverages, foodstuffs, dentifrices, mouthwashes and mouthsprays, chewing gums, and confections, including medicated confections such as cough drops, cough syrups and lozenges, as well as other pharmaceutical preparations. Such compositions are also meant to include smoking tobaccos which, when burned, produce "smoke" which is inhaled into the oral cavity.

Non-limiting examples of foodstuffs that may be sweetened and flavored by the compositions of the present invention include: cakes, pies, breads, rolls, cereals, cookies, candies, frostings, gelatin, tea, and coffee, prepared fruits such as apples, peaches, pears, cherries, and strawberries, prepared vegetables such as sweet potatos, beets, pickles, and tomatoes, sauces, and the like, wherein a sweetened and enhanced flavor are desired.

DETAILED DESCRIPTION OF THE INVENTION

More specifically, the present invention relates to compositions which contain from about .0001% to about 20.0% by weight of heliotropyl nitrile as a flavoring agent and sweetener.

The present invention primarily relates to a variety of oral and labial compositions as defined above containing heliotropyl nitrile in amounts of from about .0001% to about 2.0%. Amounts of from about .0002% to about 1.0% are preferred, with amounts of from about .0005% to about 0.3% being most preferred. Such compositions can contain heliotropyl nitrile as the sole flavoring and sweetening agent or in combination with other sweeteners and/or flavorants hereinafter described.

Combinations of heliotropyl nitrile and other sweeteners

As discussed briefly heretofore, it has been discovered that when heliotropyl nitrile is mixed or codissolved with other known natural or synthetic sweetening agents in a ratio of from about 1:1 to about 100:1, the heliotropyl nitrile acts as a potentiator, resulting in a compositions having enhanced sweetness characteristics.

Examples of suitable known syntheic sweetening agents include: saccharin, 6 - (trifluoromethyl)tryptophane, and certain aglyconic dihydrochalcones as defined in detail in the application of George P. Rizzi entitled "Dihydrochalcone Sweetening Agents," Ser. No. 76,972, filed Sept. 30, 1970, wherein small amounts of hesperetin dihydrochalcone and certain homologs thereof are used to provide novel sweetening compositions useful in various edible products.

Heliotropyl nitrile also acts as a potentiator for other sweetening agents which may be naturally occurring or prepared from natural compounds. Examples include: sucrose, lactose, dextrose, levulose, maltose and the like.

Most preferred for this aspect of the invention is heliotropyl nitrile admixed or codissolved with an aglyconic dihydrochalcone, preferably hesperetin dihydrochalcone in a ratio of from about 3:1 to about 100:1, preferably from about 10:1 to about 30:1. Such a composition possesses desirable enhanced flavor and sweetness characteristics.

Combinations of heliotropyl nitrile and other flavorants

It has also been discovered that compositions containing heliotropyl nitrile mixed or codissolved with other known flavorants results in a flavoring agent having a greatly enhanced flavor. Broadly, such flavorants include liquid and powdered extracts. Examples of such extracts include: oil of sweet birch, oil of spearmint, oil of wintergreen, anise oil, dill oil, celery seed oil, various citrus oils including lemon, orange, lime, tangerine and grapefruit oils, clove oil, peppermint oil, cassia, carrot seed oil, cola concentrate, ginger oil, angelica oil, vanillin and the like, singly and in admixtures. These flavors are obtained from the appropriate plant sources by extraction in the manner well known to those skilled in the art or may be synthetically made by known methods. Depending on the flavorant employed, an additional solvent may be employed to obtain the desired solution.

Solvents

When it is desired to have a liquid composition containing heliotropyl nitrile, it is important to utilize a suitable ingestible solvent in which to dissolve and/or suspend the heliotropyl nitrile to form the desired flavor and sweetening composition. It is equally as important to employ a suitable solvent to codissolve and/or suspend the heliotropyl nitrile and other sweetening and/or flavoring agent which may additionally be used.

The heliotropyl nitrile employed herein is slightly soluble in water, but more soluble in various polar, organic liquids. It is, therefore, possible to provide organic solvents and organic-aqueous solvents in proper formulations to dissolve heliotropyl nitrile alone, or to codissolve heliotropyl nitrile with other sweetening agents and/or flavorants, thereby providing desirable sweetening and flavor compositions for use in a variety of oral and labial compositions.

The solvents suitable for solubilizing the heliotropyl nitrile and other combinations containing heliotropyl nitrile herein described are any of the polar, organic liquids and water containing said polar, organic liquids in the amounts hereinafter detailed. Of course, when it is desired to prepare artificial sweetners suitable for prolonged or repeated ingestion by humans, it is necessary to use as a solvent for the heliotropyl nitrile a polar, organic liquid which is toxicologically acceptable. The hereinafter noted classes of polar, organic liquids which can be used to solubilize heliotropyl nitrile, heliotropyl nitrile/sweeteners and/or heliotropyl nitrile/flavorant combinations can all be ingested to a greater or lesser extent by humans without ill effects. For example, many of the organic acids are found in oxidized fat mixtures and acetic acid is a well-known constituent of vinegar. As hereinafter noted, organic acid esters are major components of most naturally occurring flavor oils. Mercaptans are found in vegetables such as the onion and garlic, while a variety of polar, organic liquids are known to be present in the so-called "fusel oil" component of alcoholic beverages. Many of these polar, organic liquids cause no ill effects if ingested occasionally and in low concentrations, but some should be avoided if repeated use is anticipated. Accordingly, there are certain preferred polar, organic liquids which can be employed herein singly, in combination one with another and/or with water, to provide desirable flavoring and sweetening compositions. These preferred, polar, liquid, organic compounds are sometimes hereinafter referred to as ingestible organic solvents. Preferred, ingestible, polar, organic liquid solvents suitable for use herein, singly, in admixtures and with water for the preparation of artificial sweetening compositions containing heliotropyl nitrile and other heliotropyl nitrile combinations disclosed herein include the ingestible members of the hereinafter disclosed classes of polar, organic liquids, especially those detailed in the list of permitted food additives periodically prepared and issued by the United States Food & Drug Administration and published in the Federal Register, and commonly referred to as the GRAS (Generally Recognized As Safe) list, which is incorporated herein by reference.

Another group of ingestible organic solvents useful herein are the polar, organic liquids classified as safe for limited use in foods under the provisions of regulation 121.1164 of the U.S. Food and Drug Administration. A wide variety of ingestible polar, organic liquids are in this category. For example, certain liquid alcohols and glycols, low molecular weight organic acids (i.e., $C_2$–$C_{10}$) organic acid esters, aldehydes, and ketones, aromatic as well as aliphatic and mixtures thereof, serve to solubilize the heliotropyl nitrile and other combinations disclosed herein and can be used herein, either alone or in mixtures. Ketones such as acetophenone, 3-decen-2-one, isopulegone and the like, all dissolve the heliotropyl nitrile combinations used herein, to provide artificial sweetening compositions. Aldehydes such as benzaldehyde, decanal, and the like, are similarly useful herein. A variety of alcohols can also be used to dissolve the compositions used in the practice of this invention to form artificial flavoring and sweetening compositions. Ethyl alcohol, 1-propanol, 3-hexen-1-ol, neopentyl alcohol, 1-decanol, sorbitan monooleate polyoxyethylene and the like, are all suitable for use singly, in admixture one with another, and in water, to provide artificial flavoring and sweetening compositions.

The liquid organic esters of the formula R"COOR", wherein R" represents straight-chain and branched alkyl groups having 1 to 10 carbon atoms, are a preferred class of solvents for use herein. The usefulness of such esters arises both because of their good solvent properties and by virtue of the fact that many esters are suitable for prolonged ingestion, themselves being major components of most natural flavor oils. Non-limiting examples of esters useful as ingestible polar, organic liquid solvents herein include: pentyl pentanoate, isobutyl formate, ethyl acetate, amyl valerate, isoamyl valerate, butyl butyrate, isobutyl propionate, isoamyl decanoate, ethyl propionate, ethyl butyrate, isoamyl acetate and isobutyl valerate all of which are suitable for use singly, in admixtures, and with water, in the instant invention.

Similarly, various naturally-occurring and synthetically-reconstituted flavor oils are suitably employed to solubilize the heliotropyl nitrile and combinations thereof with other flavoring and sweetening agents disclosed heretofore. It is not possible to specify with certainty the compositions of these various oils other than that they are highly complex liquid mixtures containing polar compounds such as lactones, alcohols, ketones, aldehydes, thiols, acids and acid esters. Some flavor oils contain nitriles, imides, organonitrates and the like. A long history of use by humans has shown that such flavor oils are physiologically acceptable and they are thus also preferred for use as ingestible organic solvents herein. Often, such flavor oils are employed with ethyl alcohol and propylene glycol to provide various extracts, tinctures and concentrates containing said oils, and it is a contemplated mode of the practice of this invention that such solutions can be used to solubilize the combinations employed herein so as to provide flavoring and sweetening compositions. These naturally-occurring, ingestible organic solvent oils can also be used with water and any of the above-noted liquids as a co-solvent. Non-limiting examples of flavor oils suitable for employment as solubilizing agents for heliotropyl nitrile and combinations thereof include: oil of sweet birch, oil of spearmint, oil of wintergreen, anise oil, dill oil, celery seed oil, various citrus oils including lemon, orange, lime, tangerine and grapefruit oils, clove oil, peppermint oil, cassia, carrot seed oil, cola concentrate, ginger oil, angelica oil and the like, singly and in admixtures, and all such oils can be used in the practice of this invention. These oils are obtained from the appropriate plant sources by extraction in the manner well known to those skilled in the art.

As discussed above, any of the above polar organic solvents in which heliotropyl nitrile and combinations with other flavoring and/or sweetening agents heretofore disclosed are soluble can be further diluted in water to yield desirable sweetening and flavoring compositions.

For example, heliotropyl nitrile can be dissolved in ethyl alcohol and then diluted with an appropriate amount of water to yield the desired concentration of heliotropyl nitrile, which composition is suitable for flavoring and sweetening foods and beverages. In like fashion, ethyl acetate can be used to dissolve heliotropyl nitrile and hesperetin dihydrochalcone and can be subsequently diluted with water to yield a sweetening and flavor composition in a desired concentration. Alternatively, heliotropyl nitrile or combinations thereof disclosed herein can be dissolved in pure ethyl alcohol in a desired concentration and the solution employed as a flavoring and sweetening composition. Thus, it is seen that dissolution of the heliotropyl nitrile and previously disclosed combinations thereof in polar, organic liquids, in mixtures thereof, and in mixtures thereof and water, results in solutions suitable for use as artificial flavoring and sweetening agents.

As hereinbefore noted, many of the ingestible polar, organic liquids which can be used to solubilize heliotropyl nitrile and the other preferred combinations of the present invention, especially the esters, have flavor properties of their own and are recognized as being major constituents in many natural flavor oils. Thus, when such solvents are used herein, even at lower concentration, they will impart to the composition being sweetened some of their own flavor; this is sometimes desirable. However, when it is desired to prepare artificial sweetening compositions containing heliotropyl nitrile having essentially no flavor sensation other than that provided by the heliotropyl nitrile, it is necessary to employ as the ingestible organic solvent for said combinations a material having little, or no, flavor properties of its own. Two ingestible organic solvents which fulfill these requirements are ethyl alcohol and 1,2-dihydroxypropane, and these solvents are preferred for use herein when it is desired to prepare artificial sweetening compositions having no additional flavor properties other than those possessed by heliotropyl nitrile. Of course, such sweetening compositions prepared with ethyl alcohol or 1,2-dihydroxypropane can be flavored by the addition of flavor oils, if so desired.

The useful concentration of 1,2-dihydroxypropane in the sweetening compositions containing heliotropyl nitrile is limited by the astringency of this compound. For this reason, sweetening compositions containing this solvent should contain no more than about 3% of the 1,2-dihydroxypropane, the remainder of the solvent being water or ethyl alcohol. Alternatively, more concentrated solutions of 1,2-dihydroxypropane, or the compound itself, can be used in the preparation of concentrated sweetening compositions which, in use, are diluted so that the amount of 1,2-dihydroxypropane in the sweetened food is below the astringency level.

Especially preferred ingestible solvents used herein are ethyl alcohol, orange oil, tangerine oil, lemon oil, lime oil, grapefruit oil, spearmint oil, peppermint oil, clove oil, 1,2-dihydroxypropane, acetic acid, isoamyl acetate, isoamyl valerate, butyl butyrate, isobutyl propionate, and sorbitan monooleate polyoxyethylene, both singly, in combination, and in combination with water.

When ethyl alcohol is selected as the ingestible polar, organic liquid solvent for use in this invention, it can be used singly and in various proportions with water. Solutions of the heliotropyl nitrile or the other preferred compositions disclosed herein of the concentrations hereinbefore disclosed in pure ethanol, and in ethanol-water mixtures containing from about 0.15% to 99% ethanol, are all suitable for use as sweetening and flavor compositions.

Formation of solvent containing liquid concentrates

Another aspect of the present invention is a variety of concentrated liquid compositions, which when added to the desired oral or labial composition, is diluted to provide said oral or labial composition with the appropriate amount of heliotropyl nitrile. Said concentrates can contain heliotropyl nitrile alone, or in combinations heretofore discussed with other flavorants and/or sweeteners. In such concentrates, heliotropyl nitrile can be present in amounts of from about .0002% to about 20.0%, preferably from about .01% to about 10%, most preferably from about .10% to about 5.0%.

Such concentrated solutions and concentrates of heliotropyl nitrile and other combinations thereof (i.e., heliotropyl nitrile/sweetener and/or flavorant) can be accomplished by simple admixture with any of the appropriate ingestible polar, organic liquids. Gentle warming can be employed to speed the rate of solution but this is entirely optional, as the heliotropyl nitrile and combinations thereof of the present invention are found relatively soluble in the above-noted ingestible organic solvents. When heating is employed, temperatures of from 40° C. to 90° C. are suitable. Preparation of aqueous-organic solutions of heliotropyl nitrile and heliotropyl nitrile/sweetener and/or flavorant combinations can be accomplished either by dissolving the heliotropyl nitrile or combination thereof in the desired ingestible polar, organic liquid and admixing the resulting solution with water, or by simply adding the heliotropyl nitrile or combination thereof to a mixture of water and ingestible organic solvent. Both of these methods are suitably employed in the practice of this invention, but is is usually found to be quicker to dissolve the heliotropyl nitrile or combination thereof in the ingestible polar, organic liquid and then to admix the resulting solution with water. The amount of organic solvent required to dissolve the heliotropyl nitrile and combinations thereof employed herein is not critical since any of the above-named solvents will dissolve sufficient material to provide concentrations falling within the ranges disclosed heretofore. Generally, ratios of ingestible organic solvent to heliotropyl nitrile of about 25:1, and greater, are suitable. When aqueous-organic solvent systems are employed to dissolve the heliotropyl nitrile or combinations thereof, the total concentration of ingestible polar, organic liquid needed to insure solubility of heliotropyl nitrile or combinations thereof in the water depends to some extent on the amount of heliotropyl nitrile and other compounds to be dissolved.

Dry concentrated compositions containing heliotropyl nitrile

Still another composition of the present invention embodies dry concentrated compositions wherein heliotropyl nitrile is admixed with a non-toxic, ingestible diluent. In such concentrated compositions, heliotropyl nitrile is present in amounts of from .0002% to about 20%, preferably .01% to about 10%, most preferably from about .10% to about 5.0%. It is to be recognized that in such a dry or liquid concentrate as previously discusssed, heliotropyl nitrile can be present in amounts greater than 20%. Practicality in terms of economics and product desirability were the criteria used in arriving at said upper limit. In the practice of this aspect of the invention, any of the commonly known diluents may be used. Non-limiting examples of such diluents include: dry starch, powdered sucrose, lactose, kaolin, mannitol, dicalcium lactate, magnesium carbonate, magnesium oxide, calcium phosphate, powdered glycyrrhiza, or other commonly used diluents. Such dry compositions can then be used to enhance the flavor of and sweeten oral and labial compositions and the like by addition thereto in amounts to achieve a flavor and sweetness desirable to the user.

Ingestible oral and labial compositions containing heliotropyl nitrile

Finally, the present invention provides for imparting to or enhancing the sweetness and flavor or oral compositions such as foodstuffs and beverages, dentifrices, mouthwashes, mouthsprays, and labial compositions such as lipsticks and lip pomades and the like. The oral and labial compositions of the present invention contain a concentration of heliotropyl nitrile of from about .0001% to about 2.0%, preferably from about .0002% to about 1.0%, most preferably in an amount of from about .0005% to about 0.3% by weight of the composition.

Dentifrices typically contain an abrasive polishing material, sudsing agents, flavor and sweetening agents. Toothpastes usually additionally contain humectants and binders.

Any abrasive polishing material which does not excessively abrade dentin can be used in dentifrice compositions. These include, for example, calcium carbonate, dicalcium orthophosphatedihydrate, calcium pyrophosphate, tricalcium phosphate, calcium polymetaphosphate, insolube sodium polymetaphosphate, and resinous abrasive materials such as particulate condensation products of urea and formaldehyde, and other such as disclosed by Cooley et al. in U.S. Pat. 3,070,510 granted Dec. 25, 1962. Silica xerogels as disclosed in U.S. Pat. 3,538,230 to Pader et al. on Nov. 3, 1970 can also be used in the compositions of the present invention.

The total amount of abrasive materials in the dentifrice embodiments of the present invention can range from 0.5% to 95% by weight of the dentifrice. (All percentages specified hereinafter refer to weight percent of the total composition unless otherwise specified.) Preferably, toothpastes contain from 20% to 60%, and tooth powders contain from 6% to 95%.

Dentrifrices usually contain sudsing agents in an amount of from about 0.5% to about 5.0%. Suitable sudsing agents for use in the dentifrices of this invention are those which yield substantial levels of foam and which are otherwise acceptable for use in the oral cavity. Examples of suitable sudsing agents include the water-soluble salts of alkyl sulfate having from 10 to 18 carbon atoms, such as sodium lauryl sulfate; water-soluble salts of sulfonated monoglycerides, such as sodium coconut monoglyceride sulfonate; water-soluble salts of fatty acid amides of taurine, e.g., sodium N-methyl-N-palmitoyl tauride; water-soluble salts of fatty acid esters of isethionic acid, e.g., the coconut acid ester of sodium isethionate; and substantially saturated aliphatic acyl amides of saturated aliphatic monoamino carboxylic acid having 2 to 6 carbon atoms and in which the acyl radical contains 12 to 16 carbon atoms, e.g., sodium N-lauroyl sarcosinate. Mixtures of two or more sudsing agents can also be used.

One or more flavoring agents are generally employed in an amount of from about .01% to about 2.0%. Suitable flavoring agents for use in the dentifrices herein include, for example, heliotropyl nitrile, wintergreen oil (methyl salicylate), oil of peppermint, oil of spearmint, oil of cinnamon, oil of anise and mixtures thereof.

Sweetening agents are also generally employed in dentifrice compositions in amounts of from about .01% to about 0.5%. Examples of suitable sweetening agents include heliotropyl nitrile either alone or admixed with saccharin and/or hesperetin dihydrochalcone, and 6-(trifluoromethyl)tryptophane.

For the purposes of the present invention, heliotropyl nitrile is preferred as a sweetening and flavoring agent in an amount of from about .0002% to about 1.0%, preferably from about .0005% to about 0.3%.

It is to be recognized that other flavoring agents heretofore disclosed in addition to heliotropyl nitrile may be used in amounts such that the total concentration of flavoring agents is up to about 2.0%. Likewise, additional sweetening agents as disclosed heretofore other than heliotropyl nitrile may also be used in amounts such that the total concentration of sweetening agents is up to about 0.5%.

In toothpastes, it is desirable to employ thickening agents such as hydroxy ethyl cellulose and water-soluble salts of cellulose ethers, including sodium carboxymethyl cellulose and sodium carboxymethyl hydroxyethyl cellulose; or natural gums, including gum karaya, gum arabic, and gum tragacanth. Also, colloidal magnesium aluminum silicate or finely divided silica can be used as part of the thickening agent to improve the texture of the product. Thickening agents in an amount of from 0.1% to 5% can be used.

In addition to the above ingredients, toothpastes of the present invention may contain oral health agents such as fluorine containing compounds. Examples of such compounds include: stannous fluoride, sodium fluoride, lithium fluoride, indium fluoride, potassium fluoride, ammonium fluoride, sodium fluostannite, stannous chlorofluoride, sodium monofluophosphate, sodium hexafluoroantimonate and the like. Such compounds are generally present in amounts of from about .01% to about 1.0%.

It is also desirable to include some humectants or viscosity modifying materials in toothpastes. Suitable materials for these purposes include glycerin, sorbitol, and other edible polyhydric alcohols or mixtures thereof. These materials can compirse up to 40% of the toothpaste composition. In addition to the aforementioned typical components of toothpaste, water and/or ethyl alcohol can be present in toothpastes at levels up to about 50%.

Mouthwashes generally comprise a water-ethyl alcohol solution and flavoring materials such as those disclosed hereinafter. The alcohol provides an antibacterial effect and also solubilizes the flavoring materials. Optionally, mouthwashes also contain additional antibacterial agents such as cetyl pyridinium chloride and domiphen bromide, and humectants such as glycerin and sorbitol which give a moist feeling to the mouth. A sweetening agent can also be employed. Examples of such sweeteners are disclosed below.

Typically, mouthwashes contain 10% to 60% ethyl alcohol, 30% to 90% water, 5% to 20% glycerin or other humetant, 0.01% to 0.1% of an antibacterial agent, 0.05% to 0.5% sweetening agent, and 0.01% to 2.0% flavoring agent. Examples of suitable flavoring agents include heliotropyl nitrile, wintergreen oil (methyl salicylate), oil of peppermint, oil of cassia, oil of anise, oil of cinnamon and mixtures thereof. Suitable sweetening agents include heliotropyl nitrile either alone or in combination with hesperetin dihydrochalcone, saccharin, glycerin, sorbitol, levulose, and/or 6-(trifluoromethyl)tryptophane.

For the purposes of the present invention, heliotropyl nitrile is preferred as the flavoring and sweetening agent being present in amounts of from about .03% to about 1.0%, preferably from about 0.5% to about .50%. Flavoring agents and mixtures thereof other than heliotropyl nitrile can be added in addition to heliotropyl nitrile such that the total concentration of flavoring agent in the composition is up to about 2.0%. Additional sweetening agents other than heliotropyl nitrile as disclosed above may also be utilized up to a total concentration of sweeteners of about 0.5%.

The aforesaid mouthwash compositions can also be administered in vaporizer or aerosol forms. When administered in aerosol forms, commonly available propellants such as hydrocarbons and fluorohalogen derivatives, for example, dichlorotetrafluoroethane, octafluorocyclobutane, dichlorodifluoromethane and tetrafluorodichloroethane, are used.

A typical soft drink contains carbonated water, flavoring and sweetening agents. A variety of flavoring agents are suitable for use in soft drinks. Generally, however, citrus oils are most preferred. Examples of suitable flavorants include heliotropyl nitrile, lemon, orange, lime, tangerine, and grapefruit oils, cola, root beer, grape, and the like. Such flavorants are generally present in amounts of from about .001% to about .10%.

Examples of suitable sweetening agents include heliotropyl nitrile either alone or in combination with saccharin, hesperetin dihydrochalcone, sucrose, levulose, and/or 6 - (trifluoromethyl)tryptophane. Sweetening agents are generally present in amounts of from about .001% to about 0.10%. Heliotropyl nitrile is most preferred as the flavoring and sweetening agent for soft drinks in amounts of from about .004% to about 0.75%.

In addition to heliotropyl nitrile, additional flavorants other than heliotropyl nitrile such as described above can be employed to obtain a total flavorant concentration of up to about .10%. Sweeteners other than heliotropyl nitrile may also be used in addition thereto such that the total concentration of sweetener is an amount up to about .10%. Examples of suitable optional sweeteners have been given heretofore.

Cake mixes embodying the concept of the invention may be formulated for any of a variety of types, such as yellow, devil's food, marble, spice, and so on.

Such mixes are formulated by methods commonly employed in the art. This may be conveniently illustrated by the following general ranges for yellow type cake mixes and chocolate type cake mixes, respectively, all proportions being by weight.

YELLOW TYPE CAKE MIX

| Ingredient: | Percent |
|---|---|
| Sugar | 35–50 |
| Flour | 35–50 |
| Shortening | 9–15 |
| Non-fat dried milk solids | 0.5–5.0 |
| Salt | 0.5–2.0 |
| Leavening | 1.0–4.0 |
| Egg solids | 1.0–4.0 |
| Flavoring (including spices) | 0.1–5.0 |
| Coloring, minor amount, if any. | |

CHOCOLATE TYPE CAKE MIX

| Ingredient: | Percent |
|---|---|
| Sugar | 35–40 |
| Flour | 25–40 |
| Shortening | 9–15 |
| Non-fat dried milk solids | 0.5–3.0 |
| Leavening | 1.0–4.0 |
| Cocoa | 4.0–8.0 |
| Salt | 0.5–2.0 |
| Flavoring | 0.1–1.0 |
| Coloring, minor amount, if any. | |

All of the ingredients listed above may be of conventional type and quality. Thus, the flour may be the usual bleached cake flour, although a good general purpose flour can be substituted, especially if appropriate emulsifiers are provided. The ordinary granulated sugars are quite satisacory, including sucrose, dextrose, maltose, fructose, lactose, and brown and invert sugars, alone or in combination. The ratio of sugar to flour may be adjusted as necessary for special circumstances but a ratio of sugar to flour in excess of 1:1 has long been known to result in particularly good cake mixes.

As to the shortening, any of the ordinary animal or vegetable fats, which may have been partially hydrogenated before use, is suitable. Preferably, the shortening should be of the so-called emulsified variety, containing up to 50%, and more normally about 5–25%, by weight, of one or more suitable emulsifiers. The partially esterified polyhydric compounds having surface active properties are an exceptionally valuable example of appropriate emulsifiers. This class of emulsifiers includes, among others, mono- and di-glycerides of fatty acids, such as monostearin, monopalmitin, monolein, and dipalmitin; partial fatty acid esters of glycols, such as propylene glycol monostearate and monobehenate; higher fatty acid esters of sugars, such as the partial palmitic and oleic acid esters of sucrose; and phosphoric and sulfuric acid esters, such as dodecyl glyceryl ether sulfate and monostearin phosphate. Mention may also be made of the partial esters of hydroxy carboxylic acids, such as lactic, citric, and tartaric acids, with polyhydric compounds, for example, glyceryl lactopalmitate, and the polyoxyethylene ethers of fatty esters of polyhydric alcohols, such as a polyoxyethylene ether of sorbitan monostearate or distearate. Fatty acids alone or esterified with a hydroxy carboxylic acid, e.g., stearyl-2-lactylate, are also useful. The condition of the shortening may vary from distinctly liquid to very firm. We have found that slightly better results are achieved with normally solid shortening and, in this case, dissemination throughout the dry ingredients is facilitated by melting the shortening prior to mixing, as is explained more fully later. This is not to imply that liquid shortenings do not produce acceptable cakes or that solid shortenings may not be mixed except in liquid conditions as any such implication would be erroneous.

The selection of a chemical leavening system from among those known in the art will pose no problem for one skilled in the formulation of culinary mixes. In general, such systems are composed of a baking soda, e.g., sodium, potassium, or ammonium bicarbonate, on the one hand, and one or more phosphate or other common baking acids on the other. Suitable baking acids include monocalcium phosphate, dicalcium phosphate, sodium acid pyrophosphate, potassium acid tartrate, monosodium phosphate, sodium aluminum phosphate, and sodium aluminum sulfate, among others. The amount of soda and the selected acid are so balanced as to achieve a pH in the resultant batter of about 6–10. Frequently, provision of a slight excess of soda is advantageous so as to assure absence of unreacted phosphate acid and/or to compensate for the acid tendencies of some batter ingredients.

For many mixes, it is accepted practice for the housewife to add the required amount of eggs in the course of batter preparaion and this practice may be followed just as well in the present mixes. If desired, the inclusion of egg solids in the mix is an allowable alternative.

The above formulations are then processed and compounded into a mix by methods commonly used in the art, which basically comprises the following steps:

(1) The major ingredients, i.e., flour, sugar, and shortening, are blended into a homogeneous premix;
(2) The premix from step (1) is passed through an impact grinder to eliminate lumps or agglomerates;
(3) The de-lumped premix is subjected to a shearing and crushing treatment;
(4) The minor ingredients are uniformly incorporated; and
(5) The total mixture is subjected to impact grinding to eliminate lumps from final product.

It has been surprisingly found that when heliotropyl nitrile alone, or as one of the other combinations described herein, is added to a cake mix as described above, in amounts of from about .001% to about 1.0%, most preferably in amounts of from about .01% to about .50%, that a cake prepared from such a mix possesses greatly enhanced flavor and enhanced sweetness characistics.

The following examples describe sweetening and flavoring compositions and their preparation as well as a variety of compositions embodying said sweetening and flavoring compositions. Said examples are given solely for the purpose of illustration and are not to be construed as limitations of this invention, many variations of which are possible without departing from the spirit and scope thereof. Unless otherwise indicated, all percentages used herein are by weight.

EXAMPLE I 20 grams of heliotropyl nitrile are thoroughly mixed with 80 grams of powdered lactose. The result is a dry sweetening and flavoring composition suitable for use without further treatment.

Compositions are prepared as in Example I except that dry starch, kaolin, mannitol, dicalcium lactate, magnesium carbonate, magnesium oxide, calcium phosphate, and powdered glycyrrhiza, respectively, are used in place of the powdered lactose. In each instance, the result is a desirable dry sweetening and flavoring composition.

EXAMPLE II 1.0 gram of heliotropyl nitrile is dissolved in 100 g. of ethyl alcohol and 1,000 g. of water is admixed therewith. The resulting solution is suitable for use as a sweetening and flavoring composition without further treatment.

EXAMPLE III 1.0 gram of heliotropyl nitrile and 0.05 gram of hesperetin dihydrochalcone are dissolved in 20 g. of 1,2-dihydroxypropane with gentle warming and 1,000 g. of water is added thereto. The resulting solution is suitable for use as a sweetening and flavoring composition without further treatment.

Sweetening and flavoring compositions are prepared substantially as disclosed in Example III except that the hesperetin dihydrochalcone is, respectively, replaced by saccharin, glycerin, sorbitol, glucose, sucrose, dextrose, 6-(trifluoromethyl) tryptophane, and levulose. Additional sweetening and flavoring compositions are prepared as in Example III except that hesperetin dihydrochalcone is replaced by 1:1 mixtures of hesperetin dihydrochalcone, respectively, with saccharin, glycerin, sorbitol, glucose, sucrose, and dextrose. Additional compositions are prepared in accordance with Example III except that the hesperetin dihydrochalcone therein is replaced by a 1:1:1 mixture of hesperetin dihydrochalcone, saccharin and sucrose. In each case, the result is a highly desirable sweetening and flavoring composition.

EXAMPLE IV

A concentrated, non-aqueous sweetening and flavoring composition having an intense sweetness is prepared in the following manner: 4 g. of heliotropyl nitrile is dissolved in 100 g. of ethyl alcohol. The resulting solution is suitable, without further treatment, for use as a highly concentrated flavoring and sweetening composition.

The above composition is prepared and in addition, 0.20 gram of hesperetin dihydrochalcone is dissolved. The resulting solution is a highly desirable flavoring and sweetening solution.

EXAMPLE V 1.0 gram of heliotropyl nitrile is dissolved in a mixture of 1,000 g. of water and 50 g. of sorbitan monooleate polyoxyethylene with gentle warming. The resulting solution is suitable for use as a flavor sweetening composition without further treatment.

EXAMPLE VI

A vanilla-flavored sweetening composition suitable for simultaneously sweetening and flavoring is prepared as follows: 1 part heliotropyl nitrile and 0.5 parts vanillin are dissolved in 50 parts ethyl alcohol. The result is a greatly enhanced vanilla-flavored sweetening composition having a prolonged flavor impact but lacking the bitter after taste frequently associated with vanillin.

EXAMPLE VII 5 parts of heliotropyl nitrile and 0.25 part of hesperetin dihydrochalcone are dissolved in 100 parts lemon oil. The resulting solution possesses, without further treatment, an enhanced lemon flavor posessing desirable sweetness characteristic.

The lemon oil is replaced by an equivalent amount of oil of sweet birch, oil of wintergreen, anise oil, dill oil, celery seed oil, bitter almond oil, orange oil, lime oil, clove oil, peppermint oil, tangerine oil, cassia, carrot seed oil, angelica oil, cola concentrate, and ginger oil and mixtures thereof, respectively, such as 1:1 mixtures of lemon and orange oil, lemon and lime oil, and cola concentrate and ginger oil. Mixtures in a ratio of about 1:1:1 are also prepared replacing the lemon oil of Example VII. An example of such a mixture is lemon oil, lime oil and orange oil. In each instance, the result is a sweetened flavor composition having an enhanced flavor and sweetness.

EXAMPLE VIII 1 part of heliotropyl nitrile is dissolved in 10 parts of isoamyl acetate and the resulting solution provides an enhanced banana-flavored flavor possessing desirable sweetness characteristics.

EXAMPLE IX 0.05 part of heliotropyl nitrile and .002 part of hesperetin dihydrochalcone are dissolved in 1 part of isoamyl valerate and the resulting solution diluted with 100 parts of a 1:1 mixture of ethanol and water to provide an apple-flavored sweetening composition.

EXAMPLE X 1 part of heliotropyl nitrile is dissolved in 20 parts of butyl butyrate to provide an enhanced pine-apple-flavored sweetening composition.

EXAMPLE XI 1 part of heliotropyl nitrile is dissolved in 25 parts of isobutyl propionate to provide a sweetening composition having an enhanced rum flavor.

Compositions are prepared substantially in accordance with Example XI except that pentyl pentanoate, isobutyl formate, ethyl acetate, amyl valerate, isoamyl valerate, butyl butyrate, isoamyl decanoate, ethyl propionate, ethyl butyrate, isoamyl acetate and isobutyl valerate, respectively, are substituted in place of isobutyl propionate. In each instance, the result in a sweetened flavor composition having enhanced properties.

EXAMPLE XII

One-tenth part of heliotropyl nitrile is dissolved in a synthetic pineapple oil (corresponding to winter fruit) consisting of 2.91 parts ethyl acetate, 0.61 parts acetaldehyde, 0.45 parts methyl n-valerate, 0.60 parts methyl isovalerate, 1.40 parts methyl isocaproate and 0.75 parts methyl caprylate to provide a sweetening composition and enhanced flavor composition.

EXAMPLE XIII

A sweetening composition is prepared as follows: 4.0% heliotropyl nitrile and 0.2% of hesperetin dihydrochalcone are dissolved in 500 ml. of ethyl alcohol and 10 ml. of orange oil added thereto.

The orange oil is replaced by an equivalent amount of lemon oil, lime oil, tangerine oil, grapefruit oil, spearmint oil, peppermint oil, and clove oil, respectively, and sweetening compositions are obtained.

As illustrated by the foregoing, heliotropyl nitrile and the mixtures of flavoring agents and sweeteners containing heliotropyl nitrile admixed with a dry ingestible diluent or dissolved in appropriate organic and aqueous-organic solvents, provide both flavored and unflavored sweetening compositions. These concentrated sweetening compositions can, themselves, be ingested but are more often used to sweeten and/or flavor other materials such as foods, beverages, confections, and other oral as well as labial compositions and the like. As discussed heretofore, such oral and labial compositions can contain heliotropyl nitrile in concentrations of from about .0001% to about 2.0%, preferably .0002% to about 1.0%, most preferably from about .0005% to about 0.3%. Such oral and labial compositions can contain heliotropyl nitrile alone, or as one of the combinations discussed in detail heretofore.

The following examples of oral and labial compositions and the like are for the purpose of illustration and are not intended to be limiting of the present invention.

EXAMPLE XIV

The following toothpaste composition is prepared by conventional methods:

| Ingredient: | Percent by weight |
|---|---|
| Calcium pyrophosphate | 40.00 |
| Sorbitol (70% aqueous solution) | 20.00 |
| Glycerin | 10.00 |
| Sodium coconut monoglyceride sulfonate | 0.81 |
| Sodium lauryl sulfate | 0.70 |
| Sodium carboxymethyl cellulose | 1.00 |
| Magnesium aluminum silicate | 0.40 |
| Stannous fluoride | 0.30 |
| Flavor (peppermint oil) | 0.85 |
| Color | 0.48 |
| Sweetener (heliotropyl nitrile .25 hesperetin dihydrochalcone .05) | 0.30 |
| Water | Balance |

The composition of this example when used as intended has a significantly enhanced flavor and possesses highly desirable sweetness characteristics.

Toothpaste compositions are prepared in accordance with Example XIV except that calcium carbonate, dicalcium orthophosphatedihydrate, calcium polymetaphosphate, xerogel, insoluble sodium polymetaphosphate and resinous abrasive materials such as particulate condensation products of urea and formaldehyde as disclosed by Cooley et al. in U.S. Pat. 3,070,510, are used respectively in place of calcium pyrophosphate. The result in each instance is a desirable toothpaste composition having enhanced flavor and sweetness characteristics.

Compositions are prepared as in Example XIV except that sodium fluoride, lithium fluoride, potassium fluoride, ammonium fluoride, sodium fluorostannate, stannous chlorofluoride, sodium monofluorophosphate, indium fluoride, and sodium hexafluoroantimonate, respectively, are used in place of stannous fluoride. The result in each instance is a toothpaste having enhanced flavor and desirable sweetness characteristics.

Compositions are prepared substantially in acordance with Example XIV except that wintergreen oil, oil of spearmint, oil of anise, and mixtures thereof are substituted for peppermint oil. In each case, a toothpaste composition with enhanced flavor and sweetness properties results.

EXAMPLE XV

A conventional mouthwash is prepared having the following composition:

| Ingredient: | Percent by weight |
|---|---|
| Glycerin | 12.0 |
| Ethyl alcohol (50% ethanol, 50% water) | 73.0 |
| Cetyl pyridinium chloride | 0.045 |
| Sorbitan monooleate polyoxyethylene | 0.15 |
| Flavor (anise oil) | 0.15 |
| Heliotropyl nitrile | 0.05 |
| Water | Balance |

The above composition possesses greatly enhanced sweetness and flavor characteristics, leaving a prolonged pleasing taste in the mouth.

A composition is prepared substantially in accordance with Example XV except that the cetyl pyridinium chloride is replaced by domiphen bromide.

The result is a desirable mouthwash having an enhanced flavor and sweetness.

Compositions in accordance with Example XV are prepared except that the anise oil therein is replaced by wintergreen oil, oil of peppermint, oil of cassia and mixtures thereof. In each instance, a desirable mouthwaste with enhanced flavor and sweetness results.

EXAMPLE XVI

A throat lozenge is prepared having the following formula:

| Ingredient: | Percent by weight |
|---|---|
| Hard candy base | 98.70 |
| Tyrothrycin | 0.30 |
| Oil of wintergreen | 0.90 |
| Heliotropyl nitrile | 0.10 |

The above composition possesses highly desirable sweetness characteristics and a greatly enhanced flavor.

EXAMPLE XVII

A lipstick is formulated as follows:

| Ingredient: | Percent by weight |
|---|---|
| Mineral oil | 15.00 |
| Castor oil | 31.15 |
| Bees wax | 20.00 |
| Paraffin | 12.15 |
| Carnauba wax | 10.00 |
| Ceresin wax | 10.00 |
| D&C red #1 color | 0.70 |
| Heliotropyl nitrile | 1.00 |

When applied to the lips in the usual manner, this composition imparts a red coloration to the lips and possesses highly desirable sweetness and flavor characteristics.

EXAMPLE XVIII

A chewing gum in accordance with this invention is formulated as follows:

| Ingredient: | Percent by weight |
|---|---|
| Gum base: | |
|   Ester gum | 6.40 |
|   Coumarone resin | 9.60 |
|   Dry latex rubber | 3.20 |
|   Paraffin wax (M.P. 180° F.) | 2.10 |
|     (Total gum base) | 21.30 |
| Sugar | 59.40 |
| Corn syrup (Baumé 45) | 18.20 |
| Oil of cinnamon | 1.00 |
| Heliotropyl nitrile | 0.10 |

This chewing gum, when used in the usual manner, imparts to the mouth an enhanced peppermint flavor with desirable sweetness characteristics.

EXAMPLE XIX

A smoking tobacco composition is prepared as follows: Approximately 2 grams of the composition as prepared in Example IV is sprayed on approximately 100 grams of cured, cased and blended commercial tobacco. The tobacco so treated is manufactured into cigarettes using the normal factory procedures and equipment.

The tobacco product made in accordance with the above example delivers smoke having a pleasing aroma and taste. Additionally, the flavor has a highly pleasing quality which lacks the harshness generally associated with some grades of tobacco.

EXAMPLE XX

A sweetened carbonated beverage is prepared having the following composition:

| Ingredient: | Percent by weight |
|---|---|
| Flavor and sweetener [1] | 1.0 |
| Phosphoric acid | 0.1 |
| Carbonated water | Balance |

[1] Composition of Example VII.

The result is a carbonated beverage with enhanced flavor and swteetness characteristics.

The lemon flavor used in Example VII is replaced by an equivalent amount of lime oil, orange oil, tangerine oil, grapefruit oil, spearmint oil, oil of wintergreen, peppermint oil, anise oil ginger oil, angelica oil, cassia, and cola concentrate and mixtures thereof, respectively, and said compositions substituted in the above example. Beverages of the corresponding flavors are obtained having enhanced flavor and sweetness characteristics.

EXAMPLE XXI

A sweetened pastry topping having an enhanced flavor is prepared as follows: A sufficient amount of the sweetening and flavoring composition of Example VIII to provide about 0.05% by weight of the heliotropyl nitrile is admixed with a glaze prepared from equal parts water, corn starch, and sorbitan monooleate polyoxyethylene.

EXAMPLE XXII

Brewed coffee and tea are sweetened as follows: a sufficient volume of the sweetening composition described in Example I is added to coffee and tea, respectively, such that the final concentration of dissolved heliotropyl nitrile in the brewed beverage is about 0.01%.

EXAMPLE XXIII

A sweetened gelatin dessert having an enhanced flavor is prepared as follows: a sufficient volume of the sweetening composition described in Example III is added to a liquefied gelatin solution such that the final concentration of dissolved heliotropyl nitrile and hesperetin dihydrochalcone in the solution is about .001%. The solution is gelled by chilling.

Cake mixes embodying the concept of this invention may be formulated for any of a variety of types such as yellow, devil's food, marble, spice and so on. Examples of such cake mixes are illustrated as follows:

EXAMPLE XXIV

A devil's food cake mix is prepared according to the following basic formulation:

| Ingredient: | Parts by weight |
|---|---|
| Flour (soft wheat cake flour including 0.5% by weight high protein wheat flour) | 40.00 |
| Sugar (industrial fine granulated sucrose and dextrose) | 36.70 |
| Shortening | 11.74 |
| Sodium bicarbonate | 2.45 |
| Sodium aluminum phosphate | .70 |
| Non-fat milk solids | 1.00 |
| Carboxymethyl cellulose | .20 |
| Salt | 1.00 |
| Chocolate flavor | 0.17 |
| Cocoa | 6.00 |
| Sweetener [1] | .04 |

[1] As disclosed in Example I.

The resulting devil's food cake mix produces a cake having significantly enhanced flavor and sweetness qualities.

EXAMPLE XXV

A yellow cake mix is prepared having the following basic formulation:

| Ingredient: | Parts by weight |
|---|---|
| Sugar (industrial fine granulated sucrose and dextrose) | 43.5 |
| Cake flour | 40.5 |
| Emulsified shortening | 11.0 |
| Non-fat milk solids | 1.5 |
| Sodium bicarbonate | 0.9 |
| Monocalcium phosphate | 0.4 |
| Sodium acid pyrophosphate | 0.8 |
| Salt | 0.7 |
| Dextrose | 0.2 |
| Favoring | 0.2 |
| Heliotropyl nitrile of Example I | 0.1 |

The above cake mix produces a yellow cake having enhanced sweetness and flavor properties.

EXAMPLE XXVI

Two cakes are prepared utilizing the cake mixes of Examples XXIV and XXV. Each cake is prepared as follows:

Nineteen ounces of the cake mixes are mixed with two whole eggs and about 1 to 1½ cups of water. Greater or lesser amounts of cake mix and water may be used if desired. This is then mixed either by hand or with a household mixer. For hand mixing, a total of 300 strokes is used, while for machine maxing, two minutes at medium speed is adequate. After mixing, equal parts of the batter are poured into two greased 8-inch round pans and baked at 350° F. for 30–35 minutes until done. The result is a devil's food and a yellow cake having enhanced flavor and notentiated sweetness qualities.

EXAMPLE XXVII

An instant coffee product having a sweetening and flavoring composition contained therein is prepared as follows: Five thousand pounds of roast and ground coffee (100% by weight through No. 8 mesh and 95% by weight on No. 20 mesh United States Standard screens) are used to prepare an aqueous coffee extract in a conventional countercurrent extraction train. The extraction train is composed of eight stainless steel columns connected in series for continuous operation. Each column is fifteen feet high, eight inches in diameter and holds approximately 450 pounds of the roast and ground coffee. Prior to extraction a volatile flavor fraction is distilled from the roast and ground coffee by passing 10 p.s.i.g. steam through each column of fresh coffee for fifteen minutes. The volatile fraction removed from the coffee is passed into a 35° F. condenser and then into a —110° F. cold trap. The total weight of condensate obtained is 10% by weight of the roast and ground coffee which was steamed. The condensate is saved for addition to a liquid extract as described below.

The steam distilled roast and ground coffee is then extracted countercurrently with water. The water enters the extraction system at 300° F. and is allowed to cool by natural heat losses as it passes through the system. The extract emitting from the last column has a temperature of 210° F. and a concentration of coffee solubles of 22% by weight.

The extract is concentrated to a 50% soluble concentration by conventional thin-film evaporation. Thereafter, the condensate from steam distillation along with a sufficient amount of the sweetener and flavorant of Example I is added to the concentrated extract such that the final concentration of dissolved heliotropyl nitrile in the extract is about 0.10%. The extract is then spray dried in a conventional spray tower, fourteen feet in diameter and thirty-five feet in height. The extract is atomized at a pressure of 550 p.s.i.g. and sprayed into a concurrent flow of hot air. The inlet temperature of the air is 560° F. and the outlet temperature is 260° F. The result is a coffee product which, when used as intended, possesses enhanced flavor and desirable sweetness characteristics, without the bitterness often associated with such a product.

What is claimed is:

1. A composition in a dry form containing as a flavoring agent and sweetener from about 0.0001% to about 20.0% by weight of heliotropyl nitrile and from about 80.0% to about 99.9999% by weight of a dry non-toxic, ingestible diluent.

2. The composition of claim 1 wherein the diluent is selected from the group consisting essentially of lactose, dry starch, powdered sucrose, kaolin, mannitol, dicalcium lactate, magnesium carbonate, magnesium oxide, calcium phosphate and powdered glycyrrhiza.

3. The composition of claim 1 wherein the diluent is lactose.

4. The composition of claim 1 wherein heliotropyl nitrile is present in an amount of from about .01% to about 10.0%.

5. The composition of claim 1 wherein heliotropyl nitrile is present in an amount of from about .10% to about 5.0%.

6. A composition in the form of a liquid which contains as a flavoring agent and sweetener, at least about 0.0001% by weight of heliotropyl nitrile and a non-toxic, ingestible solvent, the ratio of solvent to heliotropyl nitrile being greater than about 25:1.

7. The composition of claim 6 wherein the solvent is selected from the group consisting of water, and a non-toxic, ingestible polar organic solvent and mixtures thereof.

8. The composition of claim 6 wherein the solvent is water.

9. The composition of claim 6 wherein the solvent is a non-toxic, ingestible polar organic solvent selected from the group consisting of alcohols, glycols, esters, aldehydes, ketones, flavor oils, and mixtures thereof.

10. The composition of claim 6 wherein the solvent is ethyl alcohol.

11. The composition of claim 6 wherein the solvent is 1,2-dihydroxypropane.

12. The composition of claim 6 wherein the solvent is a flavor oil.

13. The composition of claim 6 wherein the solvent is an ester.

14. A composition which contains as a flavoring agent and sweetener from about 0.0001% to about 20.0% of heliotropyl nitrile and in addition a flavoring agent.

15. A composition which contains as a flavoring agent and sweetener from about 0.0001% to about 20.0% of heliotropyl nitrile and in addition a sweetening agent, wherein the ratio of heliotropyl nitrile to additional sweetening agent is from about 3:1 to about 100:1.

16. The compostion of claim 15 wherein the additional sweetening agent is selected from the group consisting of hesperetin dihydrochalcone, saccharin, 6-(trifluoromethyl)tryptophane, sucrose, dextrose, levulose, maltose, and combinations thereof.

17. The compostion of claim 15 wherein the additional sweetening agent is hesperetin dihydrochalcone in a ratio of heliotropyl nitrile to hesperetin dihydrochalcone of from about 10:1 to about 30:1.

18. A dentrifice composition containing as a flavoring agent and sweetener from about 0.0001% to about 20.0% of heliotropyl nitrile and as additional ingredients:
   (A) from about 0.5% to about 5.0% of a sudsing agent;
   (B) from 0% to about 1.9999% of a flavoring agent other than heliotropyl nitrile;
   (C) from 0% to about 0.4999% of an additional sweetening agent other then heliotropyl nitrile;
   (D) from 0% to about 95% of an abrasive material;
   (E) from about 0.1% to about 5% of a thickening material;
   (F) from 0% to about 40% of a humectant and viscosity modifying material;
   (G) from 0% to about 50% water; and
   (H) from 0% to about 1% of a fluorine-containing compound.

19. The composition of claim 18 wherein heliotropyl nitrile is present in an amount of from about .0001% to about 2.0%.

20. The compostiion of claim 18 wherein heliotropyl nitrile is present in an amount of from about .0005% to about 0.3%.

21. The composition of claim 18 wherein the flavoring agent other than heliotropyl nitrile is selected from the group consisting essentially of wintergreen oil, oil of peppermint, oil of spearmint, oil of anise, oil of cinnamon, and mixtures thereof.

22. The composition of claim 18 wherein the sweetening agent other than heliotropyl nitrile is selected from the group consisting essentially of hesperetin dihydrochalcone, 6-(trifluoromethyl)tryptophane, saccharin, and mixtures thereof.

23. The composition of claim 18 wherein the abrasive is present in an amount of from about 20% to about 60%.

24. A mouthwash composition containing as a flavoring agent and sweetener from about 0.0001% to about 20.0% of heliotropyl nitrile and as additional ingredients:
   (A) from about 10% to about 60% ethyl alcohol;
   (B) from about 5% to about 20% of a humectant;
   (C) from about 0.01% to about 0.1% of an antibacterial agent;
   (D) from 0% to about 0.2999% of a flavoring agent other than heliotropyl nitrile;
   (E) from 0% to about 0.4999% of a sweetening agent other than heliotropyl nitrile; and
   (F) from 0% to about 90% water.

25. The composition of claim 24 wherein heliotropyl nitrile is present in an amount of from about .03% to about 1.0%.

26. The composition of claim 24 wherein heliotropyl nitrile is present in an amount of from about .05% to about .50%.

27. The composition of claim 24 wherein the flavoring agent other than heliotropyl nitrile is selected from the group consisting essentially of wintergreen oil, oil of peppermint, oil of casisa, oil of anise, oil of cinnamon, and mixtures thereof.

28. The composition of claim 24 wherein the sweetening agent other than heliotropyl nitrile is selected from the group consisting essentially of hesperetindihydrochalcone, saccharin, 6-(trifluoromethyl)tryptophane, and mixtures thereof.

29. A softdrink composition containing as a flavoring agent and sweetener from about 0.0001% to about 20.0% of heliotropyl nitrile and as additional ingredients:
 (A) from 0% to about .0999% of a flavoring agent other than heliotropyl nitrile;
 (B) from 0% to about 0.999% of a sweetening agent other than heliotropyl nitrile; and
 (C) balance, carbonated water.

30. The composition of claim 29 wherein the sweetnening agent in addition to heliotropyl nitrile is selected from the group consisting essentially of hesperetin dihydrochalcone, saccharin, 6-(trifluoromethyl)tryptophane, sucrose, levulose, and mixtures thereof.

31. The composition of claim 29 wherein heliotropyl nitrile is present in an amount of from about .004% to about 0.75%.

32. The composition of claim 29 wherein the flavoring agent is selected from the group consisting essentially of oil of lemon, oil of orange, oil of lime, oil of tangerine, oil of grapefruit, cola, rootbeer, and grape, and mixtures thereof.

33. The composition of claim 32 wherein heliotropyl nitrile is present in an amount of from about .001% to about 1.0%.

34. The composition of claim 32 wherein heliotropyl nitrile is present in an amount of from about .01% to about .50%.

35. The composition of claim 32 wherein the flavoring agent other then heliotropyl nitrile is present in an amount up to about 5.0%.

36. A culinary mix composition containing as a flavoring agent and sweetener from about 0.0001% to about 20.0% of heliotropyl nitrile and as additional ingredients, sugar, flour, shortening, and a flavoring agent other than heliotropyl nitrile.

37. A coffee composition containing as a flavoring agent and sweetener from about 0.0001% to about 20.0% of heliotropyl nitrile.

38. The composition of claim 37 wherein heliotropyl nitrile is present in an amount of about .10%.

39. A coffee composition of claim 37 wherein the composition is an instant coffee composition.

40. A method of imparting or enhancing the flavor and sweetness of oral and labial composition which comprises adding thereto heliotropyl nitrile in an amount of from about .001% to about 2.0%.

References Cited

UNITED STATES PATENTS

| | | | |
|---|---|---|---|
| 3,338,783 | 8/1967 | Popjack | 424—211 X |
| 3,087,821 | 4/1963 | Horowitz et al. | 99—141 A |
| 3,535,336 | 11/1970 | Kornfeld | 99—141 A X |
| 3,583,894 | 6/1971 | Horowitz et al. | 99—141 A X |
| 3,502,695 | 3/1970 | Molho | 260—340.5 X |
| 3,287,358 | 11/1966 | Catino | 260—240 C |
| 3,296,079 | 1/1967 | Griffin | 424—49 |

OTHER REFERENCES

Van Es: "Convenient One Step Conversion of Aldehyde Into Nitriles," J. Chem. Soc (February 1965), p. 1564.

"Chemicals Used in Food Processing," Nat'l Acad. of Sciences—Nat'l Res. Council, publication 1274, Washington, L.C. (1965), p. 182.

Moncrieff: "The Chemical Senses," Leonard Hill Ltd., London (1944), p. 272.

MORRIS O. WOLK, Primary Examiner

S. MARANTZ, Assistant Examiner

U.S. Cl. X.R.

131—17, 144; 260—340.5; 424—49, 64, 177; 426—157, 166, 177, 214, 217, 221

PO-1050
(5/69)

UNITED STATES PATENT OFFICE
CERTIFICATE OF CORRECTION

Patent No. 3,778,517      Dated December 11, 1973

Inventor(s) JAMES S. NEELY

It is certified that error appears in the above-identified patent and that said Letters Patent are hereby corrected as shown below:

Col. 14, line 51, "mouthwaste" should read ---mouthwash---.

Col. 16, Example XXV, line 45, "Favoring" should read ---Flavoring---.

Col. 16, line 64, "notentiated" should read ---potentiated---.

Col. 18, Claim 18, line 26, "then" should read ---than---.

Col. 19, Claim 29, line 11, "0.999%" should read ----.0999%---.

Col. 20, Claim 40, line 11, ".001%" should read ----.0001%---.

Signed and sealed this 12th day of November 1974.

(SEAL)
Attest:

McCOY M. GIBSON JR.
Attesting Officer

C. MARSHALL DANN
Commissioner of Patents